RADIO FREQUENCY GENERATORS

Filed Oct. 24, 1966 2 Sheets-Sheet 1

INVENTOR
JOSEPH M. PROUD, JR.
BY
Robert J. Schiller
ATTORNEYS

RADIO FREQUENCY GENERATORS

Filed Oct. 24, 1966 2 Sheets-Sheet 2

INVENTOR
JOSEPH M. PROUD, JR
BY
Robert J. Schiller
ATTORNEYS

United States Patent Office 3,484,619
Patented Dec. 16, 1969

3,484,619
RADIO FREQUENCY GENERATORS

Joseph M. Proud, Jr., Wellesley, Mass., assignor to Ikor Incorporated, Burlington, Mass., a corporation of Massachusetts Filed Oct. 24, 1966, Ser. No. 588,918
Int. Cl. H03k 3/64; H01p 7/00; H04b 3/04
U.S. Cl. 307—106 9 Claims

ABSTRACT OF THE DISCLOSURE

A generator of pulse burst signals with RF content and including an electrical transmission line divided into a plurality of segments separated by gaps which act as switches. When one end of the line is pulse-changed, the pulse wave front propagates down the line. A reflection of a portion of the wave front occurs at each gap, the remainder of the wave front being then switched into the next line segment by breakdown across the gap. The successive reflections can provide a short burst (e.g., in nanoseconds) of high frequency (e.g., 500 mHz.) at very high power levels.

This invention relates to radio frequency generators and more specifically to novel apparatus for generating pulses or bursts each containing a wave-train at radio frequencies, particularly in the ultrahigh and microwave frequency ranges.

The generation of short pulses of microwave power at frequencies around 1K mc. and above has hitherto been accomplished largely by magnetrons, klystrons, and frequency multipliers. Klystrons are generally low power output devices. Magnetrons are highly precise, expensive devices. In both, generally as operating frequencies are increased, the structure size needs to be decreased with reduction in the ability of the device to dissipate heat, thereby placing a practicable limit on both the available power output and on the frequency attainable.

While further extension into shorter wave lengths is possible with frequency multipliers which typically use crystals to distort a generated wave, the power derived from the harmonics falls off very rapidly with increasing frequencies.

Useful amounts of power at wave lengths shorter than 5 mm. have been obtained from spark equipment using resonating dipoles in an insulating fluid. In such devices, a resonant dipole, typically spherical, is spaced between a pair of electrodes. A spark discharge across a gap between the electrode and the resonator excites the natural oscillation of the latter by causing a sudden collapse of the electrical field. The sparks are accompanied by damped trains of waves of random phase. Such devices are, therefore, broad-band radio emitters, and have limited power output. Attempts have been made to increase the number of resonant dipoles by arranging them in long series arrays to increase the power output. While the latter does increase it is not at all in proportion to the added number of dipoles. Also spark gaps have been mounted in microwave cavities, the latter being intended to serve as a resonant filter. Such devices are theoretically high efficiency devices but actually exhibit low power outputs. All of the foregoing devices can be termed harmonic generators in that they are oscillating devices controlled by a resonant element which establishes the fundamental frequency.

Further, in the application of pulsed microwaves to range detecting systems, the resolution obtainable is a function of the pulse duration. With conventional microwave techniques, it is extremely difficult to obtain pulses or bursts of durations shorter than micro-seconds.

A principal object of the present invention is to provide a novel RF generator capable of producing pulsed microwave power with extremely high power output and efficiency, by a traveling wave technique that converts stored DC energy into an RF burst.

A further object of the present invention is to provide such an RF generator which is capable of providing microwave power in pulses having durations in the nanosecond range. Yet other objects of the present invention are to provide an RF generator of the type described which is simple and inexpensive to construct; to provide an RF generator having a pulsed output which can be periodic or aperiodic; and to provide an RF generator of the type described which can be made to provide pulses of wave-trains at frequencies from below L-band to above X-band.

Other objects of the invention will in part be obvious and will in part appear hereinafter. The invention accordingly comprises the apparatus possessing the construction combination of elements, and arrangements of parts which are exemplified in the following detailed disclosure, and the scope of the application of which will be indicated in the claims.

For a fuller understanding of the nature and objects of the present invention, reference should be had to the following detailed description taken in connection with the accompanying drawings wherein.

Figure 4:
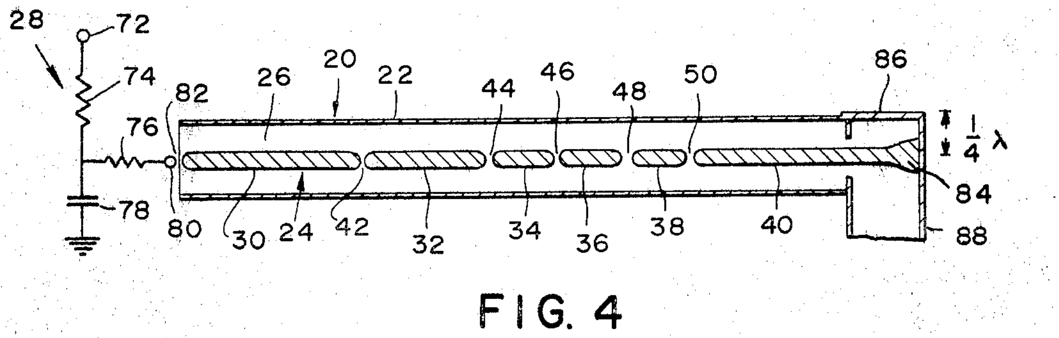
Figure 3:
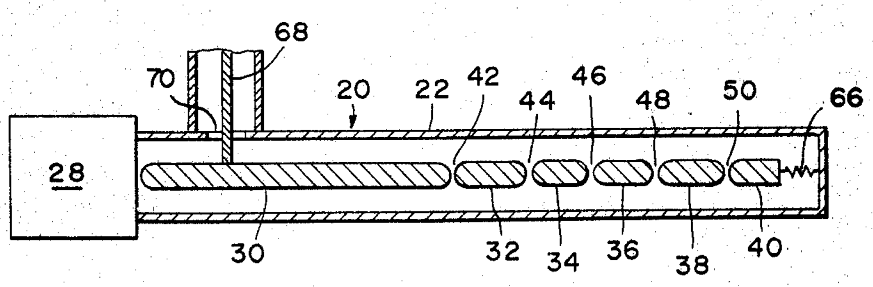
Figure 5:
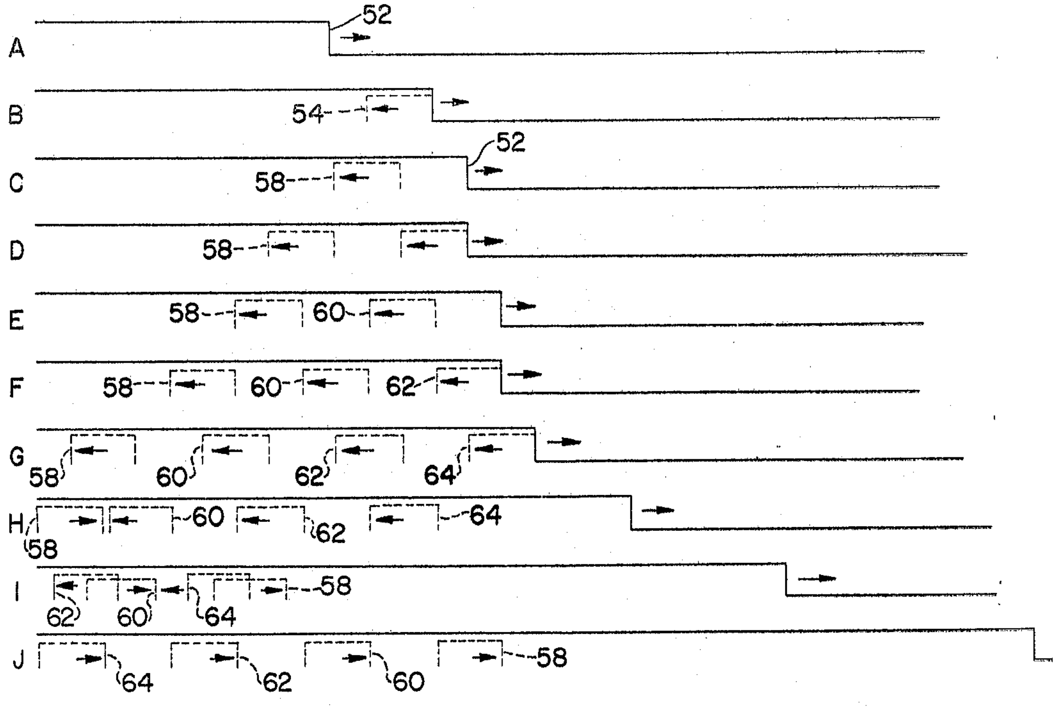

FIG. 3 is a cross-sectional view of another embodiment of the invention, partly in fragment and partly schematic, showing one system for extracting the RF burst from the device; and FIG. 4 is a cross-sectional view of yet another embodiment of the invention, partly in fragment and partly in block diagram showing another system for extracting the RF burst; and FIG. 5 is an idealized timing diagram illustrating the operation of the embodiment of FIG. 4.

The RF generator of the invention generally comprises a transmission line, means for DC impulse charging a pulse-forming section of the line, the line being broken into a plurality of sections each connectable through switching means sequentially operable responsively to a predetermined potential presented to the switching means through the immediately preceding section of line, the switching means having a high impedance when open and an impedance, when closed, nearly equal to the characteristic line impedance. Otherwise, the impedance of each section is preferably uniform and matched to the characteristic line impedance. In the preferred embodiment, once a switching means is closed so that there is conduction between adjacent sections of the transmission line, the switching means remains closed for pulses propagating in either direction and for a time corresponding to that required for extraction of RF power from either end of the device. Attenuation at each switching means should be small which implies a rapid change of state between "infinite" impedance and an impedance having a very low resistive component.

While switching devices, such as thyratrons can provide extremely fast switching times (as low as several nanoseconds) for substantial bursts of power, the simplest, extremely fast, power handling switches can be simply transmission line spark gaps having a dielectric material therein. If the transmission line is over voltaged at a gap, the latter will break down and provide conduction very rapidly. For example, for a transmission line spark gap using a dielectric of air at 760 mm. Hg at 30 kv., and a gap spacing of 0.010 inch, a spark gap will go into conduction within a nanosecond or less depending on cathode material and the gap geometry.

The generation of a large number of rectangular waves can be accomplished by placing a plurality of gaps in series in a transmission line. In essence, the energy initially stored in a rectangular traveling wave form is then broken down by a series of reflections from the progressive breakdown of the gaps to provide a series of short, traveling waves. The width of each pulse is then $T_i$ corresponding to the breakdown lag time of each gap $G_i$. The wave train may be made periodic or aperiodic by appropriate gap design (i.e. control of break down time) and/or the distance in the transmission line from gap to gap. Obviously, because no resonant elements are employed, such an RF generator should not be considered a harmonic generator.

Figure 1:
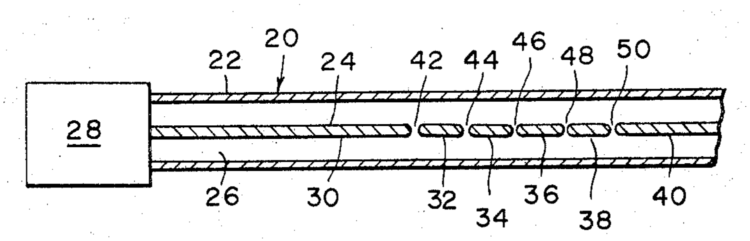
FIG. 1 is a schematic view of one embodiment of the present invention, partly in block diagram and partly in fragmentary cross section taken along the axis of propagation of an RF burst; showing the essential elements of the invention.

Referring now to FIG. 1 there is shown a device embodying the principles of the present invention and comprising transmission line 20 in the form of a coaxial cable having a cylindrical hollow outer conductor 22 and a concentric inner conductor identified generally at 24 separated from the outer conductor by dielectric material 26 such as air. Supports, such as slotted, plastic washers may be used to support the two conductors in proper relation, but for the sake of clarity in the drawing are not shown. Also not shown for the sake of clarity are bleeder resistances connecting each segment of center conductor 24 to outer conductor 22. These resistances, typically 1 mΩ, serve to dissipate residual electrical charge which would otherwise cause erratic operation and particularly hinder high repetition rate performance. With such resistances installed all portions of the transmission line are held at ground potential prior to each operation to form a wavetrain. Outer conductor 22 primarily serves as shielding as will appear later and, therefore, is continuous in the form of either a solid material or a braided mesh or the like of copper or similar substance of high electrical conductivity.

Means for introducing a substantially rectangular wave form into the transmission line are shown in the form of charging circuit 28 cooperating with a pulse-forming segment 30 of the central conductor. Impulse charging circuits are well known in the art and typically and RC circuit or a resonant charging circuit can be employed. Central conductor 24 is broken or divided into a plurality of successive line segments, such as 30, 32, 34, 36, 38, and 40.

Each line segment is closely adjacent the next succeeding segment and is separated therefrom by switching means in the form of a narrow gap in which is disposed a dielectric material. Thus, the embodiment shown includes gaps 42, 44, 46, 48 and 50. The dielectric material in the gaps is preferably self-repairing so that when breakdown occurs, the dielectric material can replace itself at a later time. The ends of the segments of conductor 24 forming the boundary of each gap, should, as well known in the art, be shaped to minimize breakdown time and also to minimize destruction of the material by arcs resulting from breakdowns. Where the dielectric material 26 of the transmission line is itself fluid, then of course it can also serve as the gap dielectric.

Segments 32, 34, 36, 38 and 40, together with the gaps constitute pulse-forming means for converting a rectangular wave traveling along segment 30 into a plurality of pulses or a wave train. In the embodiment shown, gaps 44, 46, 48 and 50 all have substantially the same dimensions and therefore, identical breakdown lag times. Because of its function as described below, gap 42 is adjusted to be of relatively slower response as compared to gaps 44, 46, 48 and 50.

As is well known, if segment 30 of the transmission line is charged to a potential V by circuit 28, when abruptly switched into the next segment 32 of similar characteristic impedance, there will be generated a traveling wave of rectangular waveform in the originally uncharged segment 32. The waveform amplitude is then $V/2$, and the length T of the rectangular waveform is twice the electrical length of segment 30. Gap 42 is adjusted to break down with sufficient delay to permit segment 30 to attain its full change voltage, V. Upon breakdown, gap 42 becomes rapidly conducting thereby launching a fast rising rectangular wave into segment 32. However, if in accordance with the present invention a spark gap 44 is placed so as to terminate segment 32, the traveling wave will encounter the high impedance of the gap and be reflected backward. The reflected wave will travel back toward its original source through now conductive gap 42 with an amplitude $V/2$ and duration $T_g$. If the traveling wave was at a high overvoltage with respect to gap 44, the latter will automatically break down and suddenly present the impedance characteristic of the line to the traveling wave, providing an abrupt decay transition to the reflected wave. The duration $T_g$ of the latter reflected wave is, therefore, determined by the time required for the spark gap to breakdown completely.

Figure 2:
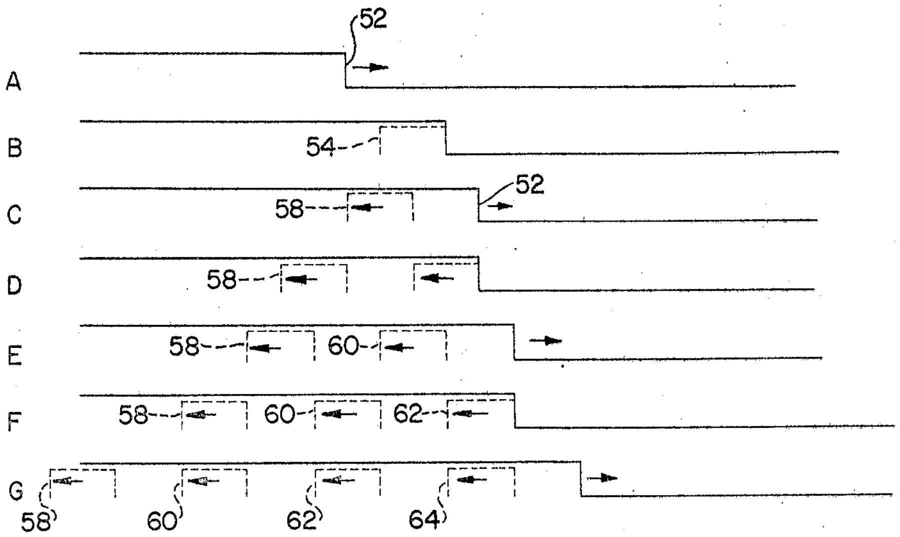
FIG. 2 is an idealized timing diagram showing the progressive formation of exemplary wave-forms in the embodiment of FIG. 1.

Thus, a high potential (e.g. 20 kv.) is impulse applied to segment 30 by circuit 28 causing the segment to become charged. When gap 42 becomes highly over-voltaged it breaks down, abruptly switching the potential on segment 30 into segment 32 as a traveling wave front 52 as is shown in FIG. 2A. This wave front, reaching gap 44, sees the initially high impedance of the latter and reflects as shown in FIG. 2B, the reflected wave front 54 being shown in dotted lines. For clarity in the drawing, the reflected wave front is shown at somewhat lesser amplitude, than the traveling wave, although where the impedance of the non-conductive gap is high compared to the line impedance, little attenuation actually occurs. Gap 44 breaks down rapidly (e.g. in 0.5 nsec.), launching wave front 52 into segment 34. Wave front 52 ultimately arrives at next gap 46 as shown in FIG. 2C. The breakdown at gap 44, of course, terminated reflected wave form 54 which then, as pulse 58, traveled backward along central conductor 24.

When wave front of the rectangular wave now meets the high impedance presented by gap 46, as is shown in FIG. 2D, it too will reflect from the high impedance of the non-conducting gap and start back toward the beginning of the transmission line. However, the advent of the wave front at gap 46 causes the latter to become overvoltaged and the gap will breakdown very quickly. This breakdown allows the initial traveling wave to be launched down the next segment 36 of the line, also causing the reflected potential to fall. Thus, a short pulse 60 of duration $T_g$ substantially established by the breakdown time of gap 46 proceeds in the opposite direction down conductor 24 as shown in FIG. 2E.

The rectangular waveform traveling down segment 36 is reduced in duration, i.e. now is $T-2T_g$, assuming that the gap 44 and 46 exhibit equal breakdown lag time equal to $T_g$. As its wave front reaches the next gap 48 there is a brief delay due to the breakdown lag time of that gap. This produces a pulse 62 by reflection while pulses 58 and 60 travel along the central conductor, all as shown in FIG. 2F. It will be apparent that a subsequent similar phenomenon occurs at gap 50.

The time separation of pulses 58 and 60 is equal to the time required for wave front 52 to propagate through the segment 34 plus the time required for the reflected waveform to propagate back through segment 34. Thus, in general, the time separation of the various pulses is equal to twice the electrical length of the segment separating the various gaps.

It will, therefore, be seen that with the proper choice of gap breakdown lag time and lengths or segments of transmission lines, a pulse train is formed by successive reflections from each gap. The pulses can proceed up the transmission line (e.g. in a direction opposite to the original direction of travel of the initial rectangular wave) without delay or reflection because each gap, once fired is maintained in conduction due to the presence of the potential of the initial rectangular wave and the impedance matching of line segments, and also because the decay of the conductive state of a gap is usually much slower than its breakdown lag time. Thus, these segments joined by conducting gaps act as an ordinary transmission line. The end result of these successive switchings is to convert D.C. energy of the rectangular pulse into a series of spaced pulses as shown in FIG. 2G. The pulse train can be periodic simply by matching the electrical length of each section of the pulse-forming portion of the central conductor, or can be made aperiodic by using different lengths for those sections of central conductor. The number of pulses produced is established by the number of segments in the pulse-forming portion of the line. Thus for the four segments shown in FIG. 1, four corresponding pulses are produced as shown in FIG. 2G. In order for the device to operate properly, it will be apparent that all but the last of the gaps (i.e. gap 50) must remain in conduction for a time sufficient to allow the last pulse 64 to traverse the system.

The duration T of the initial rectangular waveform should be related to the switching means as follows:

(1) $$T \geq \sum_{i=1}^{N} T_{g_i}$$

where N is the number of switches such as spark gaps producing reflected pulses of duration $T_{g_i}$. Where the switching means are spark gaps, of course, $T_{g_i}$ is the breakdown lag time of the *i*th gap. If all lag times are equal to $T_g$ and $T_g$ is, in turn, equal to the two-way transit time through the segments between gaps, then a periodic and symmetrical waveform is generated at a frequency given by (2) $$f=\frac{1}{2T_g}$$

The high frequency limits of the wave train produced by the RF generator of the invention appear to be set primarily by $T_g$. Time lags as short as 0.3 nsec. have been routinely measured and it is believed that highly overvoltaged gaps may exhibit time lags shorter than 0.1 nsec. Thus, frequencies as high as $10^{10}$ c.p.s. or higher appear practicable. Obviously, at low frequencies the length of the system becomes awkward and sets a practical limit.

Considering the energy initially stored in the initial pulse forming section of line and its subsequent break-up into a train of waves, the power P contained in such a train will be given approximately by (3) $$P \approx 10^{-3} V_0^2 \text{ (watts)}$$

Known impulse charging techniques will permit charge voltages, $V_0$, as high as $10^6$ volts and perhaps as high as $10^7$ volts. Thus, a rectangular wave can be formed with power content as high as about $10^9$ to about $10^{11}$ watts. In the above conversion process, comparable power may be expected in the RF spectrum subject to reductions due to losses and conversion efficiency. In addition to voltage as a parameter for determining power, there exists a wide variety of transmission line geometries. Strip-line geometry, for example, could be employed to increase the capacitance per unit length and, thus the energy content of the generated pulses.

Referring now to FIG. 3 there will be seen an embodiment similar to that of FIG. 1, like numerals indicating like parts. However, it will be seen that means, for example in the form of load resistor 66 connecting outer conductor 22 and segment 38, are included for providing a termination to the transmission line. If one wishes to obtain no reflection of the last portion of energy (i.e. that transmitted through gap 50 into segment 40) thus providing a clean termination to the pulse train, then the value of resistor 66 is selected to be about equal to the characteristic impedance of the line whereby absorption of that energy portion will occur. Also, there is included lead 68, impedance matched to the line, and extending transversely to the axis of the transmission line through opening 70 in outer conductor 22, and connecting directly to segment 30. This configuration permits the pulse train formed by reflections from the gaps in the transmission line to be taken out of the system. The T configuration formed by lead 68 and segment 30 can be a coupling into a wave guide or another coaxial line, or can constitute half of a half-wave antenna or dipole.

It will be apparent that in the configuration of FIG. 3, the RF pulse train is taken out of the generator adjacent the end of the transmission line in which the initial rectangular pulse is formed, and hence after single reflections of the original input energy to the system. However, the RF burst can also be taken out of the transmission line at the down-stream or far end of the transmission line. As shown in FIG. 4, a typical charging circuit 28 comprises input terminal 72 adapted to be connected to a source of high charging voltage, e.g. 20 kv. or the like. One side of charging resistor 74 is connected to terminal 72, the other side being connected to one side of storage capacitor 78. The other side of the capacitor is grounded. In one example, the capacitor can be about 500 picofarads and resistor 64 can be about 1K mΩ. The junction of the capacitor and charging resistor is connected through damping resistor 76 (e.g. about 2000Ω) to terminal 80. The latter is typically separated by high speed switching means, such as spark gap 82, from the input end of central conductor 24 of transmission line 20.

It will be appreciated that when a high potential is applied at terminal 72, capacitor 78 will become charged. When this charge results in gap 82 becoming over-voltaged, the gap will breakdown, switching the potential onto first segment 30 of the central conductor 24 of the transmission line. Resistor 76 functions to insure that the charge is dumped into segment 82 exponentially rather than in an oscillatory manner, thus insuring a substantially rather than in an oscillatory manner, thus insuring a substantially smooth approach to charge voltage V.

When next gap 42 breaks down, the rectangular travelling wave is launched into segment 32 of the transmission line in the same manner as heretofore described in FIG. 1 and herein repeated for clarity in FIG. 5A. Thus, as shown in FIGS. 5B and C there is a first wavefront 54 formed by reflection at gap 44 which then becomes pulse 58. FIGS. 5D and E show the formation of the next successive pulse 60 which occurs at gap 46. Now, although the initial rectangular wave is traveling in one direction down the transmission line, the reflected pulses 58 and 60 are traveling in the opposite direction. FIGS. 5F and G illustrate the subsequent development of pulses 62 and 64. When each of these pulses successively reaches the high impedance mismatch presented, for example, by damping resistor 76, they are reflected again, and therefore proceed to propagate down the transmission line in the same direction as, but lagging, the initial rectangular wave. This is shown in FIGS. 5H and I and J. It will be apparent that each reflected pulse formed, reduces the duration of the initial rectangular traveling wave by an amount equal to the duration of each such reflected pulse as described above. Thus, the initial rectangular DC pulse of long duration is used to generate a series or train of traveling small rectangular waves, each being formed by reflection at a respective gap, and each being subsequently reflected again down the tarnsmission line in the same direction as the initial rectangular pulse as shown finally in FIG. 5J. Preferably the initial rectangular pulse can be just long enough to produce such a train so that all of the energy initially in the long pulse is now distributed in the train of short pulses.

In the embodiment of FIG. 4, the down-stream end of the line, i.e. segment 40, is terminated by a device for extracting the RF energy, typically the usual doorknob extension 84 of the segment into rectangular wave guide 88, preferably ¼ wave length from the curved end of guide 88.

In an experimental embodiment of the invention constructed according to FIG. 3, the transmission line was fabricated using 2″ diameter aluminum tubing for outer conductor 22 and ⅜″ brass rod for inner conductor 24. The latter was supported by a number of polyethylene discs with care to keep impedance discontinuities to a minimum. With reference to FIG. 3, segment 30 was 52″ in length, segments 32, 34, 36 and 38 were 6″ and section 40 was 10″. Resistance 66 was equal to the characteristic impedance of the line or about 100Ω. Capacity divider probes were installed both upstream and downstream for waveform measurement purposes. The impulse changing circuit 28 was of the type illustrated in FIG. 4. Resistor 74 was 1K mΩ, capacitor 78 was 900 pf. and resistor 76 was 2KΩ. A voltage of 20 kv. was applied to terminal 72. Again, with reference to FIG. 3, lead 68 together with its outer conductor composed a coaxial dipole radiator with overall length equal to 12″. A simple aluminum corner reflector was positioned behind the dipole to cause any radiation produced to be directive.

The waveform as measured by the capacity dividers exhibited the expected form, i.e. a train of waves was produced with $T_g$ equal to about 0.6 nsec. Individual pulses in the train of waves were separated 1.0 nsec. corresponding to the two-way transit time of the segments between spark gaps. The wavetrain was then described by a frequency of approximately 600 mc. and a total duration of 6.4 nsec. In operation, repetition rates of bursts were attained at 20 p.p.s. with peak power in the burst of about $10^5$ watts. Thus, for the foregoing experimental system, a shorter burst at higher power has been produced than has hitherto been readily obtainable. It will be apparent that, inasmuch as all the gaps are enclosed by the outer conductor of the coaxial line, then any random waves generated in the gaps at best will be of very low power and, therefore, cause little attenuation and will be well shielded by the outer conductor.

With the operation of the system established at the above conditions, further experiments were conducted in which the RF burst was observed as radiated by the dipole and corner reflector above described. A 600 mc. burst was observed whose width (at half-power points) was about 5 nsec. The signal produced was very strong (several hundred volts/meter at laboratory distances, and its amplitude and phase were of such consistency as to permit ranging with resolution substantially less than 12″.

Since certain changes may be made in the above apparatus without departing from the scope of the invention herein involved, it is intended that all matter contained in the above description or shown in the accompanying drawing shall be interpreted in an illustrative and not in a limiting sense.

What is claimed is:

1. An RF generator of pulse burst signals comprising in combination:

an electrical transmission line having an electrical conductor divided into a plurality of sequential segments;

a plurality of switching means each for electrically coupling one of said segments to the next successive segment;

means for launching a substantially rectangular wave into said conductor for travel therethrough in a first direction;

each of said switching means being responsive, within a predetermined interval, to the advent of the wavefront of said wave at said each switching means so as to allow a portion of said wave to be reflected in the opposite direction by the high impedance state of said each switching means, and to allow the remainder of said wave to be transmitted to the next segment through the low impedance state of said each switching means.

2. An RF generator as defined in claim 1 wherein said switching means are spark gaps of substantially fixed dimensions in said conductor, and are normally filled with a self-repairing dielectric material.

3. An RF generator as defined in claim 2 wherein said gaps all exhibit substantially the same breakdown lag time to said wave at a given voltage.

4. An RF generator as defined in claim 1 wherein said segments are substantially impedance matched to one another.

5. An RF generator as defined in claim 1 wherein said transmission line is a coaxial cable in which the central conductor is said divided electrical conductor.

6. An RF generator as defined in claim 2 wherein said means for launching said wave includes:

a charging circuit; and means for wave-forming an impulse charge from said circuit into a rectangular wave.

7. An RF generator as defined in claim 6 wherein said means for wave-forming comprises a conductive line segment having one end immediately adjacent said one end of said conductor, and separated by a spark gap therefrom, the other end of said conductive line segment being separated from said charging circuit by another spark gap, said conductive line segment being substantially greater in length than said other segments.

8. An RF generator as defined in claim 1, including:

means coupled adjacent said input end for extracting said reflected portions from said conductor.

9. An RF generator as defined in claim 1, including:

means for providing a second reflection to each of said reflected portions so as to redirect the latter in said first direction; and means coupled adjacent the end of said conductor opposite to said input end for extracting said second reflections from said conductor.

References Cited

UNITED STATES PATENTS

| | | | |
|---|---|---|---|
| 2,420,302 | 5/1947 | Darlington | 307—108 X |
| 2,769,909 | 11/1956 | Radmacher | 307—106 X |
| 2,792,508 | 5/1957 | Samsel | 307—106 |
| 2,932,802 | 4/1960 | Lorch | 307—106 |

ROBERT K. SCHAEFER, Primary Examiner

D. SMITH, Jr., Assistant Examiner

U.S. Cl. X.R.

315—39; 333—96, 82, 20